US012743382B2

(12) United States Patent
Wallach

(10) Patent No.: US 12,743,382 B2
(45) **Date of Patent: *Sep. 22, 2026**

(54) KEY MANAGEMENT IN COMPUTER PROCESSORS

(71) Applicant: Lodestar Licensing Group LLC, Evanston, IL (US)

(72) Inventor: Steven Jeffrey Wallach, Dallas, TX (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/513,148

(22) Filed: Nov. 17, 2023

(65) Prior Publication Data

US 2024/0095189 A1 Mar. 21, 2024

Related U.S. Application Data

(63) Continuation of application No. 17/341,988, filed on Jun. 8, 2021, now Pat. No. 11,868,274, which is a (Continued)

(51) Int. Cl.

*G06F 21/00* (2013.01)
*G06F 12/1018* (2016.01)

(Continued)

(52) U.S. Cl.

CPC ...... *G06F 12/1408* (2013.01); *G06F 12/1018* (2013.01); *G06F 12/1475* (2013.01);

(Continued)

(58) Field of Classification Search

CPC ............. G06F 12/1408; G06F 12/1475; G06F 12/1018; G06F 21/79; G06F 21/602; G06F 21/71; G06F 2212/1052; G06F 21/6218; G06F 21/85; H04L 9/0861; H04L 9/0894; H04L 9/0897

See application file for complete search history.

(56) References Cited

U.S. PATENT DOCUMENTS 4,318,125 A * 3/1982 Shutterly ............... H04N 7/169 348/476
5,285,497 A * 2/1994 Thatcher, Jr. ........... H04L 9/065 348/425.2

(Continued)

FOREIGN PATENT DOCUMENTS

WO 2008/054456 A2 5/2008

OTHER PUBLICATIONS

US 2010/0122095 A1, 05/2010, Jones et al. (withdrawn)

(Continued)

*Primary Examiner* — Mahfuzur Rahman

(57) ABSTRACT

Systems, apparatuses, and methods related to a computer system having a processor and a main memory storing scrambled data are described. The processor may have a secure zone configured to store keys and an unscrambled zone configured to operate on unscrambled data. The processor can convert the scrambled data into the unscrambled data in the unscrambled zone using the keys retrieved from the secure zone in response to execution of instructions configured to operate on the unscrambled data. Another processor may also be coupled with the memory, but can be prevented from accessing the unscrambled data in the unscrambled zone.

10 Claims, 8 Drawing Sheets

Related U.S. Application Data continuation of application No. 16/134,387, filed on Sep. 18, 2018, now Pat. No. 11,074,198.

(51) Int. Cl.

| | |
|---|---|
| ***G06F 12/14*** | (2006.01) |
| ***G06F 21/60*** | (2013.01) |
| ***G06F 21/71*** | (2013.01) |
| ***G06F 21/79*** | (2013.01) |
| ***H04L 9/08*** | (2006.01) |

(52) U.S. Cl.

CPC ............ *G06F 21/602* (2013.01); *G06F 21/71* (2013.01); *G06F 21/79* (2013.01); *H04L 9/0861* (2013.01); *H04L 9/0894* (2013.01); *G06F 2212/1052* (2013.01)

(56) References Cited

U.S. PATENT DOCUMENTS

| | | | | |
|---|---|---|---|---|
| 6,377,690 | B1 * | 4/2002 | Witschorik | H04L 63/18 380/268 |
| 6,567,817 | B1 * | 5/2003 | VanLeer | G06F 12/0871 707/999.102 |
| 6,856,594 | B1 * | 2/2005 | Aihara | H04L 1/22 370/535 |
| 7,848,521 | B2 * | 12/2010 | Leporini | H04N 21/2541 705/52 |
| 8,639,625 | B1 * | 1/2014 | Ginter | G06F 21/78 705/50 |
| 8,854,882 | B2 * | 10/2014 | Strasser | G11C 29/02 365/185.11 |
| 9,117,060 | B2 * | 8/2015 | Petkov | G06F 21/125 |
| 9,208,897 | B2 * | 12/2015 | Strasser | G06F 12/0246 |
| 9,432,298 | B1 * | 8/2016 | Smith | H04L 49/9057 |
| 10,311,229 | B1 * | 6/2019 | Pohlack | G06F 9/45558 |
| 10,740,466 | B1 | 8/2020 | Bshara et al. | |
| 11,074,198 | B2 | 7/2021 | Wallach | |
| 11,102,553 | B2 * | 8/2021 | Chan | H04N 21/4348 |
| 11,868,274 | B2 | 1/2024 | Wallach | |
| 2003/0110382 | A1 * | 6/2003 | Leporini | G06F 21/10 713/172 |
| 2004/0268387 | A1 * | 12/2004 | Wendling | H04N 5/445 725/35 |
| 2007/0226807 | A1 * | 9/2007 | Ginter | H04N 21/2541 713/168 |
| 2009/0129394 | A1 * | 5/2009 | Bar-Kovetz | H04L 49/90 370/395.32 |
| 2009/0307250 | A1 * | 12/2009 | Koifman | G06F 21/62 |
| 2010/0016683 | A1 * | 1/2010 | Lemmers | H04L 12/2825 715/764 |
| 2010/0106954 | A1 | 4/2010 | Muchsel et al. | |
| 2010/0287622 | A1 * | 11/2010 | Petkov | G06F 21/125 380/59 |
| 2010/0296653 | A1 | 11/2010 | Richardson | |
| 2011/0157992 | A1 * | 6/2011 | Strasser | G06F 12/0246 365/185.18 |
| 2011/0182119 | A1 * | 7/2011 | Strasser | G11C 29/021 365/185.24 |
| 2011/0185193 | A1 * | 7/2011 | Grube | G06F 11/1076 713/189 |
| 2011/0231630 | A1 * | 9/2011 | Dannowski | G06F 12/1036 711/E12.065 |
| 2012/0151224 | A1 * | 6/2012 | Koifman | H04L 69/04 713/193 |
| 2013/0185536 | A1 | 7/2013 | Mari et al. | |
| 2013/0201905 | A1 * | 8/2013 | Ling | H04L 61/5007 370/316 |
| 2013/0231945 | A1 * | 9/2013 | Barry | G06Q 10/10 705/2 |
| 2014/0047549 | A1 * | 2/2014 | Bostley, III | G06F 21/62 726/26 |
| 2014/0056068 | A1 * | 2/2014 | Strasser | G11C 16/3418 365/185.03 |
| 2014/0369118 | A1 * | 12/2014 | Strasser | G11C 11/56 365/185.03 |
| 2015/0229471 | A1 * | 8/2015 | Nair | H04L 9/0891 713/171 |
| 2015/0234751 | A1 | 8/2015 | Van Der Sluis et al. | |
| 2016/0188492 | A1 | 6/2016 | Bachwani et al. | |
| 2016/0234348 | A1 * | 8/2016 | Mao | H04L 69/08 |
| 2017/0286421 | A1 * | 10/2017 | Hayenga | G06F 21/75 |
| 2017/0357830 | A1 | 12/2017 | Benson et al. | |
| 2017/0371809 | A1 | 12/2017 | Benedict | |
| 2019/0205244 | A1 * | 7/2019 | Smith | G06F 3/065 |
| 2019/0227708 | A1 * | 7/2019 | Hsieh | G06F 3/0679 |
| 2019/0392124 | A1 * | 12/2019 | Mueglitz | H04W 12/08 |
| 2020/0089625 | A1 * | 3/2020 | Wallach | G06F 21/72 |
| 2021/0294754 | A1 * | 9/2021 | Wallach | G06F 21/602 |
| 2021/0319894 | A1 * | 10/2021 | Sobol | G16H 50/30 |
| 2024/0095189 | A1 * | 3/2024 | Wallach | G06F 12/1475 |

OTHER PUBLICATIONS

Encryption, Wikipedia, printed on Sep. 11, 2018.
Extended European Search Report, EP19861468.7, mailed on May 13, 2022.
International Search Report and Written Opinion, PCT/US2019/050613, mailed Dec. 26, 2019.
Meltdown (security vulnerability), Wikipedia, printed on Sep. 11, 2018.
Scrambler, Wikipedia, printed on Jul. 31, 2018.
Side-channel attack, Wikipedia, printed on Sep. 11, 2018.
Spectre (security vulnerability), Wikipedia, printed on Sep. 11, 2018.

* cited by examiner

KEY MANAGEMENT IN COMPUTER PROCESSORS

RELATED APPLICATIONS

The present application is a continuation application of U.S. patent application Ser. No. 17/341,988 filed Jun. 8, 2021, which is a continuation application of U.S. patent application Ser. No. 16/134,387 filed Sep. 18, 2018 and issued as U.S. Pat. No. 11,074,198 on Jul. 27, 2021, the entire disclosures of which applications are hereby incorporated herein by reference.

The present application relates to U.S. patent application Ser. No. 16/054,913, filed Aug. 3, 2018, issued as U.S. Pat. No. 11,113,422 on Sep. 7, 2021, and entitled "Data Protection in Computer Processors," the entire disclosure of which application is hereby incorporated herein by reference.

TECHNICAL FIELD

At least some embodiments disclosed herein relate generally to computer architecture and more specifically, but not limited to, key management for data security in computer processors and/or for data transmission in computing systems.

BACKGROUND

A typical computer processor receives instructions and/or data from a main memory of the computer system for processing. The instructions and/or data can be cached for the processor. In some instances, unauthorized access to the content in the main memory or the processor cache may be made. For example, multiple processors or processing cores formed on a same die can share the main memory. One processor or processing core can access the content for another processor or processing core through the shared main memory and/or a processor cache memory through memory sharing and/or a cache coherence protocol.

For example, speculative execution is a computing technique where a processor executes one or more instructions based on the speculation that such instructions need to be executed under some conditions, before the determination result is available as to whether such instructions should be executed or not. Speculative execution can lead to security vulnerabilities where unauthorized access to content can be made. Examples of security vulnerabilities in computer processors include Meltdown and Spectre that were made public in 2018.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of protecting data in a computer processor via data scrambling. For example, an original data item can be scrambled by rearranging the order of parts of the original data item according to a random key to generate a scrambled data item such that the scrambled data item having the reordered parts does not reveal the original data item as a whole; and the original data item and the correct order of the parts cannot be derived from the scrambled data item without the key. In an unscrambling operation, parts of the scrambled data item are reordered according to the key to recover the original data item.

For example, a data item addressable using an address in the computer processor can be stored in a scrambled form before its use in instruction execution. The scrambled data item can be an instruction, an address, or an operand to be operated upon by an instruction. The data item can be cached in the scrambled form in an internal cache and/or an external cache; and/or the data item can be stored in the main memory in the scrambled form. Unscrambling can be performed inside the processor to recover the data item just in time for the data item to be used in the processor. When the data item is scrambled, it can be difficult or impossible to recover the data item from the scrambled form without the key. The processor unscrambles the data item using the secret key(s) to execute upon the data item. Thus, the data security in the processor is improved. For example, in a side-channel attack, concurrently running applications may attempt to gain unauthorized data access. Since only the application holding the unscramble key can recover the unscrambled data, the side-channel attack can be defeated. Preferably, the keys or secrets for the scrambling and thus corresponding unscrambling operations are random numbers; and the scrambling/unscrambling operations do not involve computationally intensive operations such as those required in asymmetric cryptography. Preferably, the keys or secrets for the scrambling/unscramble operations in the processor are not mathematical/numerical representations of entities, such as the public or private key pairs in asymmetric cryptography.

Figure 1:
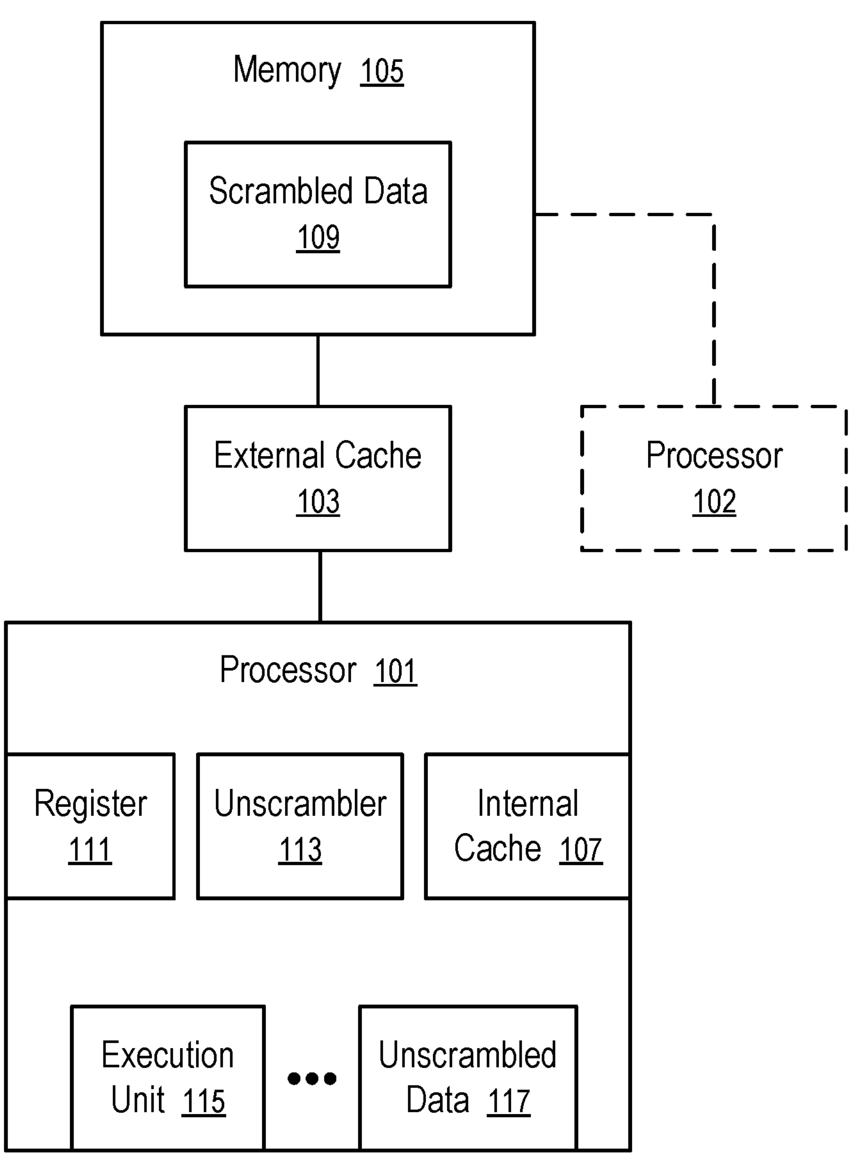
FIG. 1 shows a processor having an unscrambler according to at least some embodiments.

FIG. 1 shows a processor (101) having an unscrambler (113) according to at least some embodiments.

In FIG. 1, the processor (101) is coupled to a memory (105) that supplies instructions and data to the processor (101) for execution. The memory (105) stores scrambled data (109) that needs to be unscrambled using secret keys. In general, the memory (105) can be the main memory of the computer system, or a storage device of the computer system, or a hybrid memory and storage device. The memory (105) can include volatile memory and/or non-volatile memory.

The processor (101) may load the scrambled data (109) into an external cache (103) and/or an internal cache (107). Since the content in the external cache (103) and/or the internal cache (107) is scrambled using the secret keys, the content is protected against unauthorized access.

The unscrambler (113) is coupled between the internal cache (107) and a register (111) and/or an execution unit (115). The unscrambler (113) generates the unscrambled data (117) just in time for use in the register (111) or the execution unit (115).

For example, the scrambled data (109) can be an instruction to be executed in the processor (101). The instruction can be stored in a scrambled form in the internal cache (107), the external cache (103), and/or the memory (105). Just before the execution of the instruction, the unscrambler (113) converts it into an unscrambled form. The execution unit (115) then executes the instruction.

In some instances, the processor (101) also includes a scrambler that scrambles the result of the execution to generate a scrambled result that is subsequently stored in the internal cache (107), the external cache (103), and/or the memory (105).

In another example, the scrambled data (109) is an operand to be operated upon by an instruction in the processor (101). The item can be stored in the internal cache (107), the external cache (103), and/or the memory (105) in the scrambled form. Just before the item is loaded into the register (111) or the execution unit (115) for operations, the unscrambler (113) converts it into an unscrambled form. The execution unit (115) then uses the item in the execution of the instruction. For example, the execution unit (115) can be an arithmetic-logic unit; and the item can be an operand to be operated upon during the execution of an instruction in the arithmetic-logic unit, or the instruction itself.

Since the data item is in a scrambled form in the memory (105), the external cache (103), and the internal cache (107), another processor (102) having access to the memory (105), the external cache (103), and the internal cache (107) cannot recover the unscrambled data item without the keys or secrets for unscrambling.

Preferably, the scramble/unscramble operations are configured such that the performance impact in the processor (101) is reduced/minimized.

For example, scrambling/unscrambling can be performed by reordering the bits in a data item. The data item has a predetermined width that corresponds to the number of bits in the data item and/or the width of the register (111) of the processor (101). The operation of reordering the bits within the data item can be performed efficiently using multiplexers illustrated in FIGS. 2 and 3.

Figure 2:
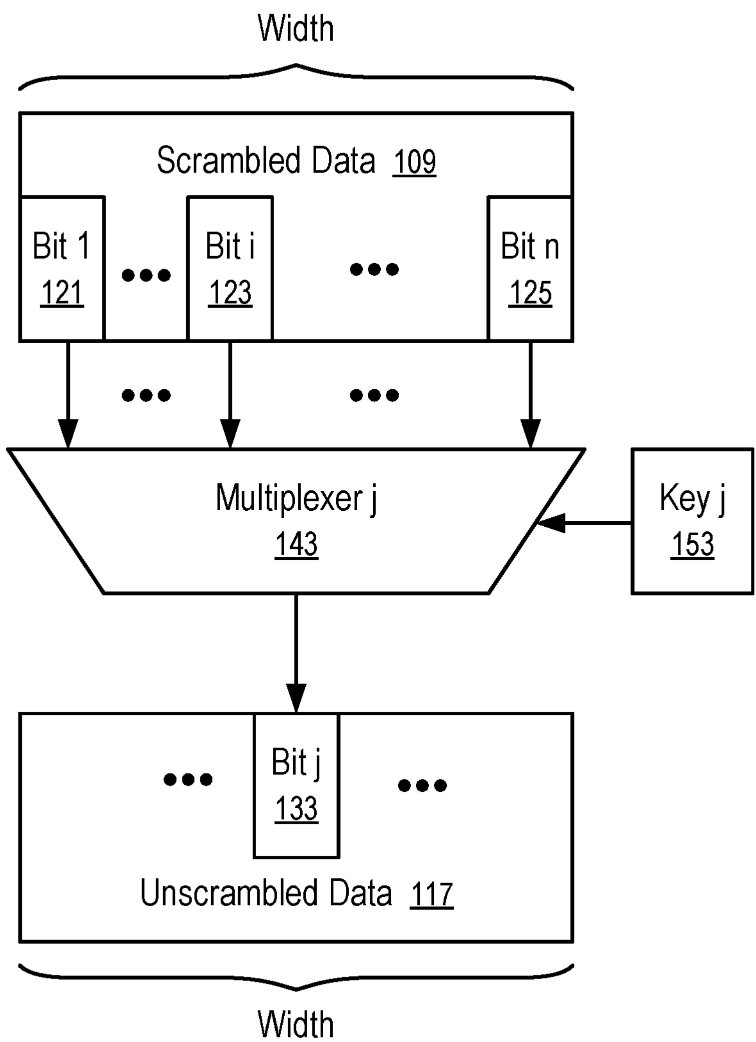
FIG. 2 shows the operations of an unscrambler for recovering a bit from scrambled data.

FIG. 2 shows the operations of an unscrambler (113) for recovering a bit (113) of unscrambled data (117) from scrambled data (109).

In FIG. 2, the bit j (133) at a particular position in the unscrambled data (117) is recovered by applying a corresponding key j (153) to a multiplexer (143). The multiplexer (143) receives the n bits (121, . . . , 123, . . . , 125) of the scrambled data (109) as inputs. The key j (153) specifies which one (e.g., 123) of the input bits (121, . . . , 125) is to be selected by the multiplexer (143) as the output bit (133) at the given position j in the unscrambled data (117). The order of the bits (121, . . . , 123, . . . , 125) in the scrambled data (109) has been changed from the order of the bits in the unscrambled data (109). The key j (153) is used to select the correct bit (e.g., 123) from the scrambled data (109) as a bit at a particular position j in the unscrambled data (117). Without the secret/key j (153), the randomly scrambled ordering of the bits (121, . . . , 123, . . . , 125) in the scrambled data (109) masks the true value of the unscrambled data (117). Therefore, a direct interpretation of the scrambled data (109) is useless. The scrambled data (109) appears as a random number.

The operation of the multiplexer (143) can be implemented efficiently in the processor (101) using a logic circuit with minimum delay in the execution pipeline. No numerical or complex encryption algorithm operations (e.g., multiplication or division of integer numbers or floating-point numbers) are required to unscramble the data. Thus, an unscrambler (113) based on the operation of FIG. 2 has minimum impact on the operating performance of the processor (101).

Figure 3:
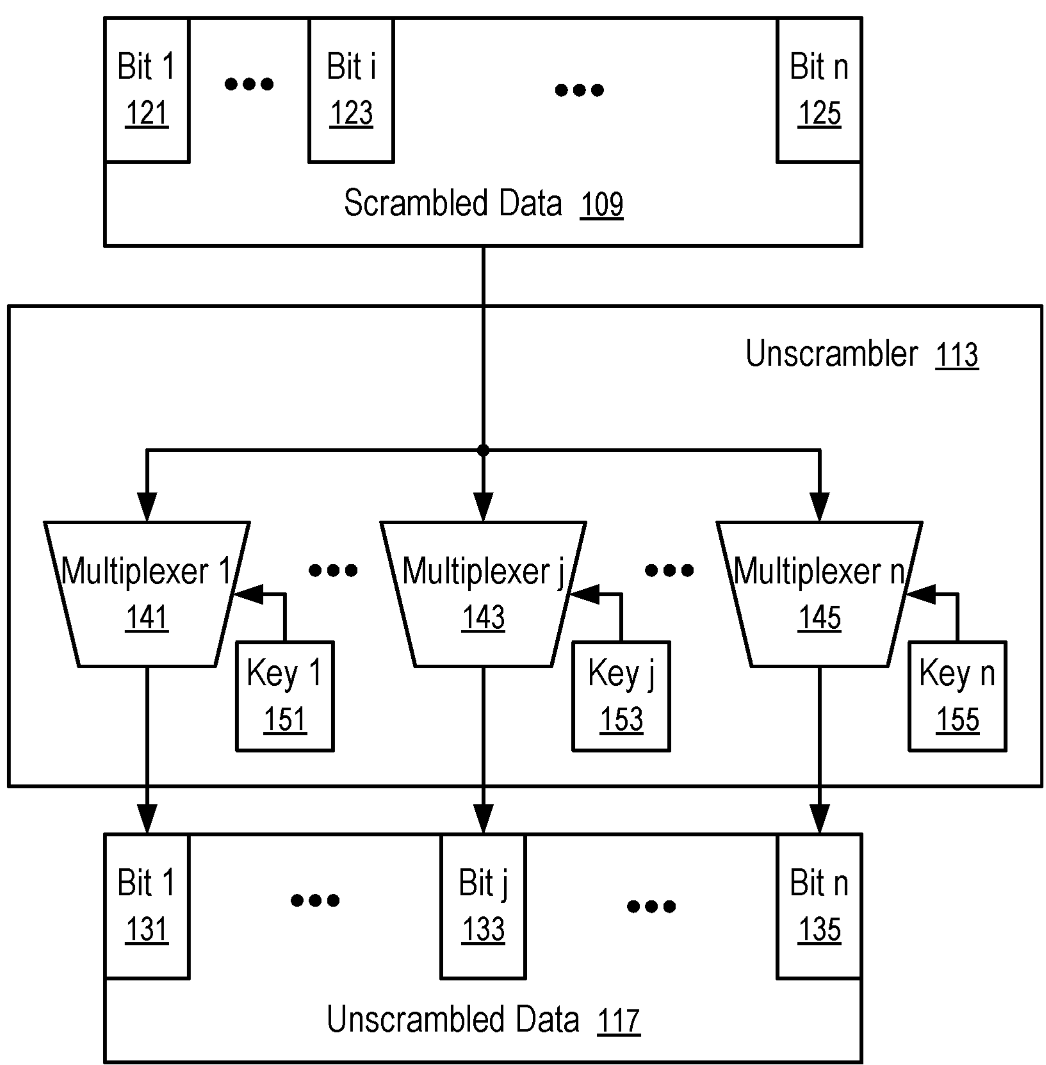
FIG. 3 illustrates an unscrambler of a processor.

FIG. 3 illustrates an unscrambler of a processor.

In FIG. 3, the scrambled data (109) and the unscrambled data (117) have the same number (n) of bits. A same number (n) of multiplexers (141, . . . , 143, . . . , 145) are used to operate on input bits (121, . . . , 123, . . . , 125) of the scrambled data (109) to output the respective output bits (131, . . . , 133, . . . , 135) of the unscrambled data (117). The multiplexers (141, . . . , 143, . . . , 145) change the order of the bits (121, . . . , 123, . . . , 125) of the scramble data (109) to the order of the bits (131, . . . , 133, . . . , 135) of the unscrambled data (117).

Preferably, the multiplexers (141, . . . , 143, . . . , 145) are operated concurrently to minimize the delay caused by unscrambling. Alternatively, a reduced number of multiplexers can be used to reduce logic circuits used to implement the unscramble; and the reduced set of multiplexers can be used in iterations of operations to generate different subsets of output bits (131, . . . , 133, . . . , 135), such that the complete set of output bits (131, . . . , 133, . . . , 135) can be computed through the iterations.

As illustrated in FIG. 3, the scrambled data (109) and the unscrambled data (117) have the same number (n) of bits and the same values for corresponding bits. For example, bit i (123) in the scrambled data (109) corresponds to bit j (133) in the unscrambled data (117). Thus, the scrambled data (109) and the unscrambled data (117) differ from each other in their bit sequences; and the unscrambled data (117) can be considered as scrambled version of the scrambled data (109). Therefore, the set of multiplexers (141, . . . , 143, . . . , 145) of the unscrambler (113) can be used with a complementary set of keys to select the bits (131, . . . , 133, . . . , 135) of the unscrambled data (117) to generate the bits (121, . . . , 123, . . . , 125) of the scrambled data (109). For example, since unscrambling key j (153) identifies select input bit i (123) from position i of the scrambled data (109) as output bit j (133) at position j of the unscrambled data (117), a complementary scrambling key i identifies position j in the unscrambled data (117) for selection as the bit i (123) at position i in the scrambled data (109). Thus, the scrambling keys can be computed from the unscrambling keys (151, . . . , 153, . . . , 155). By applying the complementary set of scrambling keys in the unscrambler (113) to operate on the unscrambled data (117), the unscrambler (113) can function as a scrambler to generate the scrambled data (109). Similarly, the unscrambling keys (151, . . . , 153, . . . , 155) can be computed from the scrambling keys. Therefore, a scrambler can be implemented in a way as the unscrambler (113) implemented in FIG. 3; and the unscrambler (113) can be reconfigured as a scrambler (113) by loading a set of scrambling keys to replace the unscrambling keys (151, 153, . . . , 155).

As illustrated in the FIG. 3, the scramble/unscrambling operations do not change the data size (n) before and after the operations. The storage capacity requirement for the scrambled data (109) is the same as the storage capacity requirement for the unscrambled data (117). No extra memory/storage capacity is required for the scrambled data (109).

FIGS. 2 and 3 illustrate a preferred unscrambler (113). In general, other unscramblers can also be used in the processor (101).

For example, a scrambler/unscrambler can be performed by selectively inverting a bit according to the value of a corresponding bit in a key. If the corresponding bit in a key has a predetermined value (e.g., 1), the bit of the input data is inverted to generate the corresponding bit of the output data; otherwise, the bit of the output data is the same as the bit of the input data.

For example, the bit inversion operation can be combined with bit re-positioning as in FIGS. 2 and 3 for scrambling/unscrambling.

Figure 4:
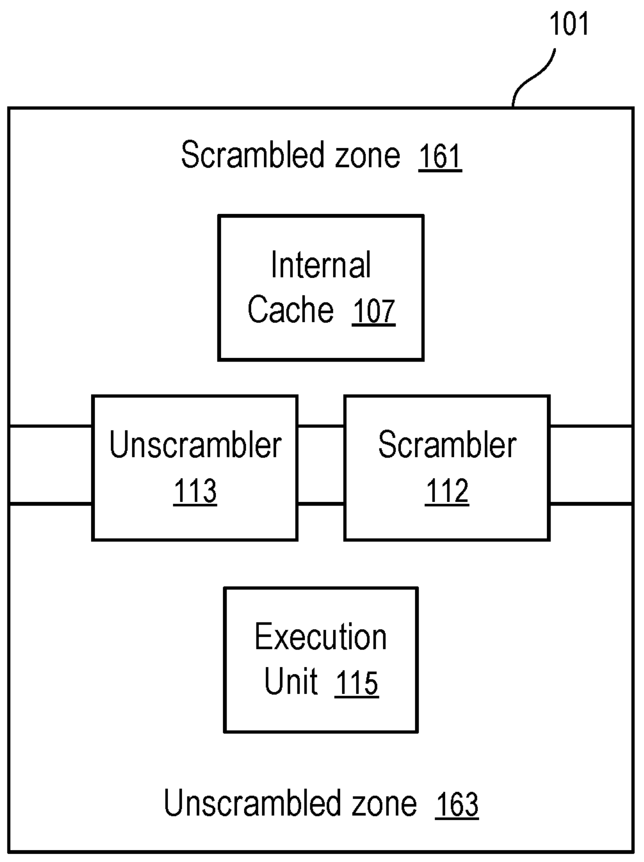
FIG. 4 shows a structure of a processor having different data security zones according to one embodiment.

FIG. 4 shows a structure of a processor (101) having different data security zones (161, 163) according to one embodiment.

The processor (101) can have a scrambled zone (161) and an unscrambled zone (163). The scrambled zone (161) includes the internal cache (107). The unscrambled zone (163) includes the execution unit (115). Thus, the execution unit (115) does not operate on any scrambled data (e.g., 109). The register (111) can be in the scrambled zone (161) or the unscrambled zone (163). An unscrambler (113) and a scrambler (112) interface or connect the scrambled zone (161) and the unscrambled zone (163). Content in the scrambled zone (161) is in a scrambled form; and content in the unscrambled zone (163) is in an unscrambled form. The processor (101) unscrambles content in the scrambled zone (161) to perform computation in the unscrambled zone (163) and scrambles the computation results before the computation results leave the unscrambled zone (163) and enter the scrambled zone (161). For example, in response to a load instruction, the unscrambler (113) converts scrambled data (109) into the unscrambled data (117) (e.g., for an arithmetic-logic unit of the processor (101)); and the unscrambler (113) does not use the arithmetic-logic unit for unscrambling operations. In response to a store instruction, the scrambler (112) converts a data item to be stored from an unscrambled form into a scrambled form. The scrambled result can be initially cached in the scrambled zone (161) and then stored in the external cache (103), the main memory (105), and/or a peripheral storage device in the scrambled form. Optionally, the unscrambler (113) and the scrambler (112) can share a portion of logic circuits (e.g., multipliers (141, . . . , 143, . . . , 145)). For example, the unscrambler (113) configured to load data from the scrambled zone (161) to the unscrambled zone (163) in response to load instructions can be reconfigured as a scrambler (112) by changing the keys (151, . . . , 153, . . . , 155) for scrambling output data going from the unscrambled zone (163) to the scrambled zone (161) in response to store instructions.

FIG. 1 illustrates the storing of data in a scrambled form in the main memory (105) and the cache memories (103 and 107) of a processor (101). Data can also be in the scrambled form in a storage device (e.g., a disk or a flash drive coupled to a peripheral bus of a computer system). Thus, when the data is loaded from the storage device into the main memory (105) and/or the cache memories (103 and 107), it is already in the scrambled form.

The use of the unscrambler (113) in the processor (101) limits the availability of clear, unscrambled content to only in a portion of the processor (101) and thus improves data security in the computer system.

Figure 5:
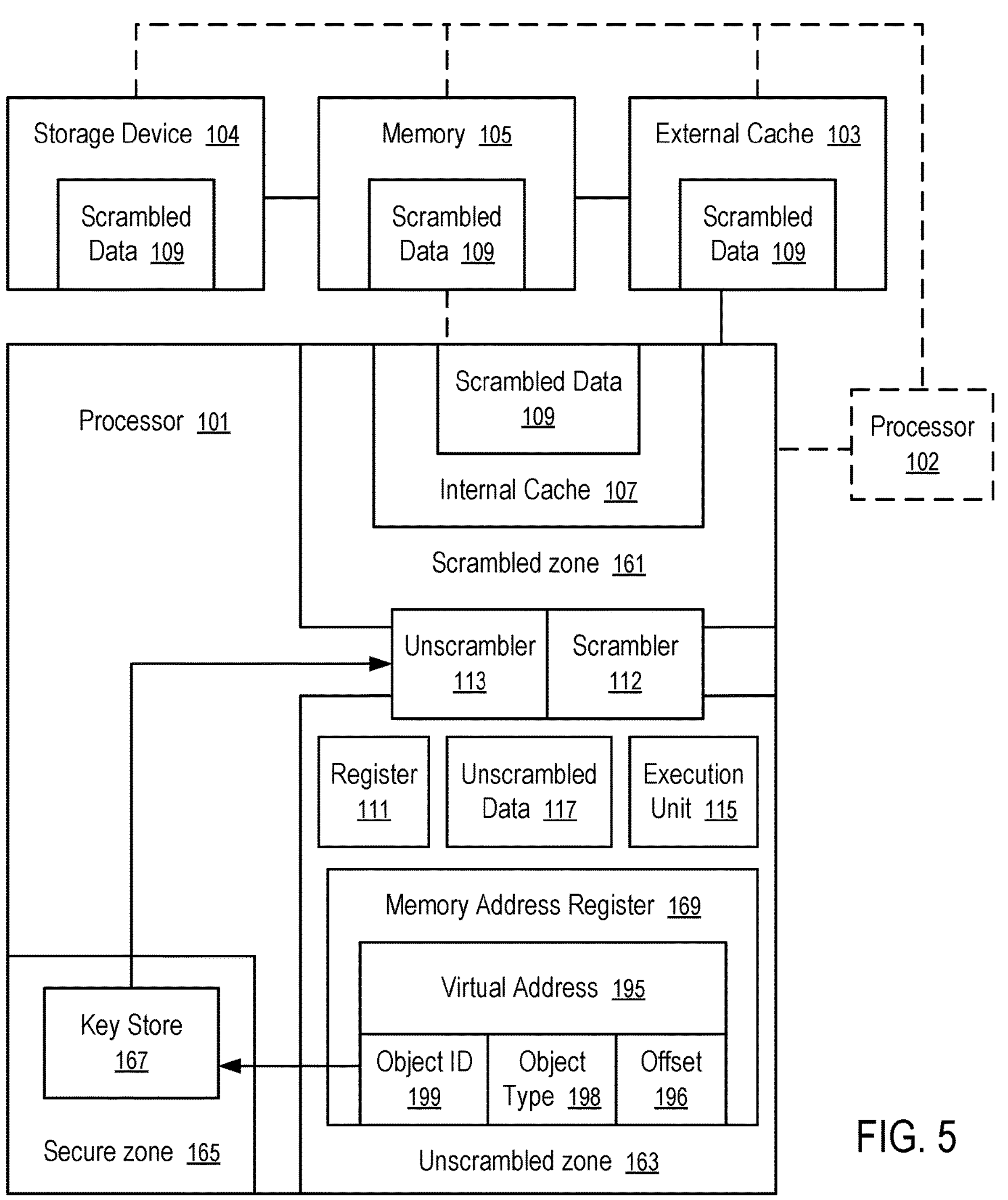
FIG. 5 shows a key store in a processor for data security according to one embodiment.

FIG. 5 shows a key store (167) in a processor (101) for data security according to one embodiment.

In FIG. 5, the processor (101) has an unscrambled zone (163) for performing computation on data (117) in an unscrambled form. Other processors (e.g., 102) can be provided with access to certain resources of the processor (101), such as the storage device (104), the memory (105), the external cache (103), and/or the internal cache (107). However, these processors (e.g., 102) are prevented from accessing the unscrambled zone (163) of the processor (101). For example, the processors (101 and 102) can be different processing cores formed on a same silicon die and/or packaged in a same integrated circuit chip. In other examples, the processors (101 and 102) can be packaged in different integrated circuit chips and connected via a communication connection, such as a bus, an interconnect, a network, etc.

A malicious program, for example, may run in a processor (102) and attempt to gain unauthorized access to content to be processed by the processor (101) (e.g., using security vulnerabilities such as Meltdown and Spectre). To protect against such unauthorized access, data (109) can be stored in a scrambled form in locations outside the unscrambled zone (163). For example, the data (109) is stored in a scrambled form in the storage device (104), in the main memory (105) of a computer, and in the external cache (103) that is shared between the processors (101 and 102). Further, the data (109) can be stored in a scrambled form in the scrambled zone (161) of the processor (101), such as the internal cache (107) of the processor (101), when the processor (102) can access the internal cache (107) via a cache coherence protocol.

In FIG. 5, the unscrambler (113) of the processor (101) converts the scrambled data (109) into the unscrambled data (117) when the processor (101) runs the instructions that are authorized to process the scrambled data (109). The presence of the unscrambled data (117) is confined within the unscrambled zone (163). Since another processor (102) is prevented from accessing the unscrambled zone (163) of the processor (101), a malicious program running in the processor (102) can be prevented from gaining unauthorized access to the unscrambled data (117) (e.g., through security vulnerabilities such as Meltdown and Spectre).

In FIG. 5, the processor (101) has a secure zone (165) that includes a key store (167). The key store (167) has the keys for the unscrambler (113) and the scrambler (112) for various data objects. Without access to the respective keys of the objects, the processors (101 and 102) cannot recover the unscrambled data (117) from the scrambled data (109).

In FIG. 5, the access to the key store (167) is based at least in part on the virtual address (195) used to load the scrambled data (109) for operations to be performed within the unscrambled zone (163).

For example, the virtual address (195) can include fields such as object ID (199), object type (198), and/or offset (196).

For example, the virtual memory address (195) can have a predetermined width (a predetermined bits) and stored in the memory address register (169) of the processor (101). The virtual address (195) can include a portion representing an object ID (199) and a portion representing an offset (196) within the object represented by the object ID (199).

For example, an object located at the address (195) can be a set of instructions or a routine; and the object ID (199) of the virtual address (195) can be used to identify certain proprieties of the instruction and/or the routine, such as access rights.

For example, an object located at the virtual address (195) can be a data file, data set, or data item; and the object ID (199) of the virtual address (195) can be used to identify access rights of the data.

In some instances, an object name server is configured to store attributes of an object identified via the object ID (199). The processors (101 and 102) can query the object name server to obtain the attributes for access control.

In some instances, a static object ID of a predetermined value (e.g., 0) can be used to represent a kernel object of an operating system (104). Thus, the static object ID specified in the memory address can be used to identify certain access restrictions without having to communicate with an object name server. Some details and examples of static object IDs in memory addresses for computer processors to load instructions for execution can be found in U.S. patent application Ser. No. 16/028,840, filed Jul. 6, 2018, issued as U.S. Pat. No. 11,275,587 on Mar. 15, 2022, and entitled "Static Identifications in Object-based Memory Access," the entire disclosure of which application is hereby incorporated herein by reference.

In some instances, the virtual memory address (195) and/or the object ID (e.g., 199) of the memory address can include a portion representing an object type (198). For example, an object type (198) of a value from 0 to 3 can be used to identify a kernel object of an operating system. For example, an object type (198) of a value of 4 to 5 can be used to specify that the offset is an address of different widths (e.g., a 64-bit address or 32-bit address included within the memory address that has 128 bits). For example, an object type (198) of a value of 6 to 7 can be used to specify that a predetermined portion of the object ID is to be interpreted as an identifier of a local object or an object in partitioned global address space (PGAS). For example, an object type (198) of a value of 32 can be used to specify that the remaining portion of the object ID is to be interpreted as an identifier of an object defined in a server.

The object type (198) and/or the object ID (199) can be optionally used to determine access privileges.

In FIG. 5, the object ID (199) can be used to access the key store (167) to retrieve a key for the object represented by the object ID (199). Thus, when the unscrambled zone (163) is authorized to load, via the virtual address (195), the scrambled data (109) into the unscrambled zone (163) for processing, the key for the unscrambler (113) can be retrieved or obtained from the key store (167) to generate the unscrambled data (117) from the scrambled data (109).

When the unscrambled data (117) leaves the unscrambled zone (163) (e.g., to be stored at the virtual address (195) as a computation result and/or as part of the object represented by the object ID (199)), the scrambler (112) converts the unscrambled data (117) into the scrambled data (109). By reducing the locations and durations of the presence of the unscrambled data (117), data security of the computer system is improved.

In general, the unscrambled data (117) can be an instruction, an operand, and/or a result of the execution unit (115) executing an instruction. The unscrambled zone (163) can include a register to store a virtual address for loading scrambled operands into the unscrambled zone (163), a register to store a virtual address for exporting scrambled results from the unscrambled zone (163), and/or a register (e.g., program counter) to store a virtual address for loading scrambled instructions into the unscrambled zone (163). For example, the unscrambled zone (163) can include a program counter, programmer visible register files, and/or a memory address register. Programs running outside of the unscrambled zone (163) of a processor (101) (e.g., in another processor (102), such as a separate processing core), are generally prevented from accessing the unscrambled zone (163) of the processor (101), although such external programs may access the caches (e.g., 103 and/or 107) and the main memory (e.g., 105) where the content is in a scrambled form. The execution units (e.g., 115) can perform operations (e.g., arithmetic operations) on operands stored in registers and generate results in registers. Such registers for operands and results can be configured in the unscrambled zone (163) such that the execution units (e.g., 115) operate and generate data in the unscrambled form; and therefore, scrambling outside of the unscrambled zone (163) does not impact the operations and/or efficiency of the execution units (e.g., 115). The program counter can increase the address stored in it by one to execute the next instruction, or be assigned a branch address to execute the instruction at the given branch address. The program counter can also be configured in the unscrambled zone (163) such that its operations are based on unscrambled addresses. Thus, the content of the program counter and/or addresses for identifying operands in the main memory (e.g., 105) can be unscrambled addresses in the unscrambled zone (163).

Figure 6:
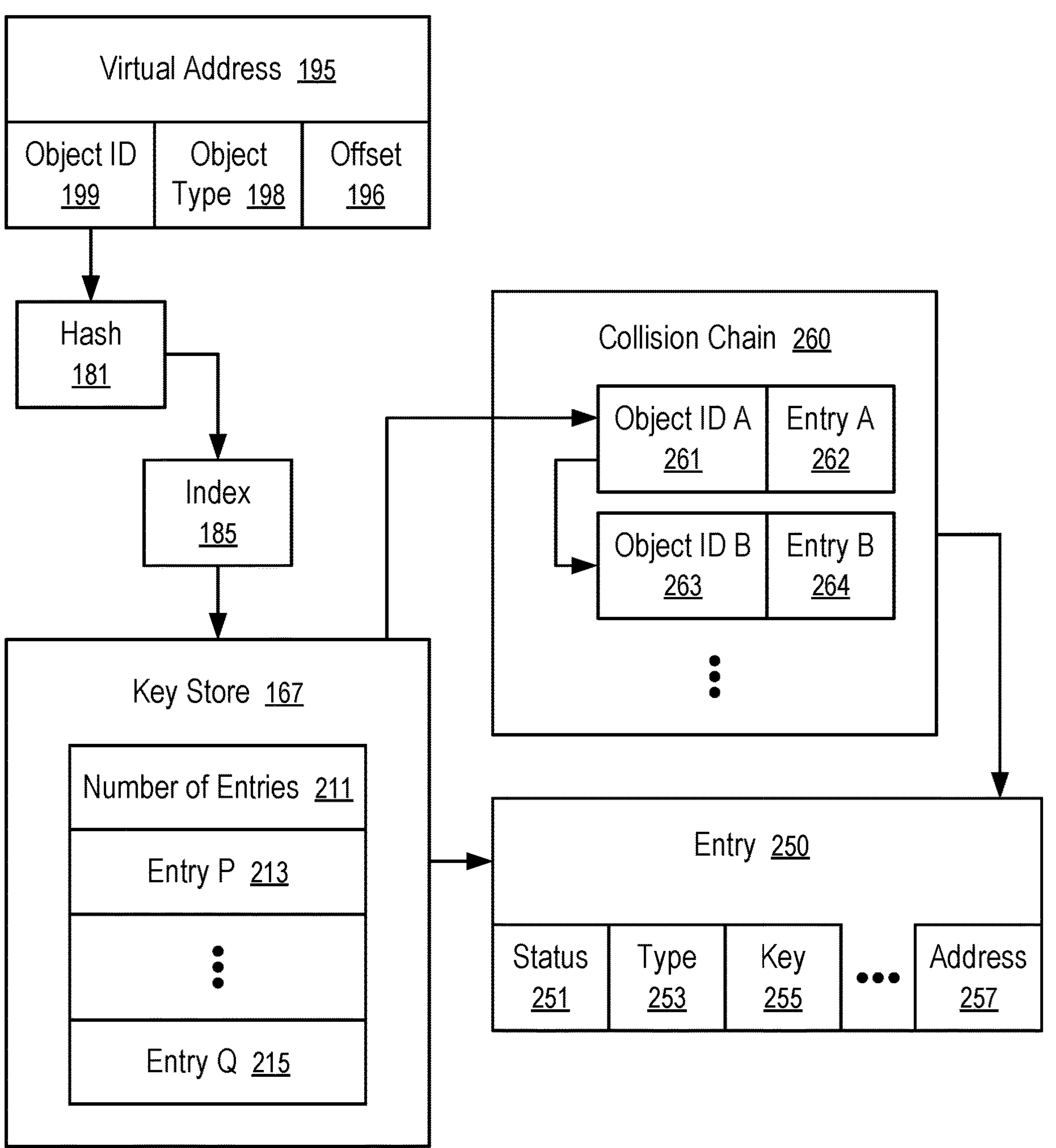
FIG. 6 illustrates a technique to locate a key based on a virtual memory address according to one embodiment.

FIG. 6 illustrates a technique to locate a key (255) based on a virtual memory address (195) according to one embodiment.

The virtual address (195) in FIG. 6 can include an object ID (199), an object type (198), and/or an offset (196). For example, the virtual address (195) can have a width of 128 bits; a number of bits (e.g., 59 or 58) of the virtual address (195) can be used to store the object ID (199), another number of bits (e.g., 5 or 6) of the virtual address (195) can be used to store the object type (198), and the remaining bits (e.g., 64) of the virtual address can be used to store the offset (196) relative to the object that has the type (198) and the ID (199). For example, the virtual address (195) can be an address stored in the memory (105), as configured, programmed, and/or seen by a programmer or user of a routine.

In FIG. 6, a hash (181) is applied on the object ID (199) to generate an index (185). The index (185) has a less number of bits than the object ID (199) and thus reduces the size of the key store (167) for looking up an entry (e.g., 213, . . . , 215) from the key store (167).

However, hash collision can occur when multiple items are hashed into a same index. Chaining is one of the techniques to resolve hash collisions. The index resulting from a collision can be used to retrieve a list/chain of key-value pairs. Each item that is hashed into the index can be configured as the key in a corresponding key-value pair in the list; and the look up result for the item can be configured as the value in the corresponding key-value pair. To retrieve the look up result of one of the items that are hashed into the same index, the list/chain of key-value pairs identified via the index can be searched to find a key-value pair where the key matches with the item. The value of the matching key-value pair provides the look up result.

When there is no hash collision for the index (185), the entry (e.g., 213, . . . , or 215) at the index (185) in the key store (167) can be retrieved as the resulting entry (250).

When there is hash collision for the index (185), the entry (e.g., 213, . . . , or 215) at the index (185) in the key store (167) identifies a collision chain (260). The collision chain (260) has a list/chain showing the entries (e.g., 262, 264, . . . ) for the object IDs (e.g., 261, 263) that are hashed (181) into the same index (185). The collision chain (260) can be searched to locate the entry (e.g., 262, or 264) that is specified for an object ID (e.g., 261 or 263) that matches with the object ID (199) before the hash (181). The located entry (e.g., 262, or 264) is illustrated as the resulting entry (250).

In general, the hash (181) can be applied to a combination of the object ID (199), optionally the object type (198), and/or a portion of the offset (196). Further, scrambling can be specific for different virtual machines, different processes, and/or different users. Thus, the hash (181) can be applied to a combination of a portion of the virtual address (195), an identifier of the current virtual machine for which the processor (101) is executing instructions, a processor ID of the current process of a running instance of a program, an identifier of a user account and/or a user for which the processor (101) is currently executing instructions, etc.

Alternatively, securities for isolating different virtual machines, different processes, and/or different users can be implemented through scrambling using keys for different virtual machines, keys for different processes, and/or keys for different users. The different layers of scrambling protection for virtual machines, running instances/processes, and/or users/user accounts can be combined through scrambling keys, as further illustrated below in connection with FIG. 8. When the keys for different combination of objects, virtual machines, running instances/processes, and/or users/user accounts are derived from combining the separate keys for the objects, keys for the virtual machines, keys for the instances/processes, and/or keys for the users/user accounts, the size of the key store (167) can be reduced.

A typical entry (250) looked up from the key store (167) using the index (185) can have multiple fields (251, 253, 255, . . . , 257) for subsequent security operations. The values of the fields can be adjusted as needed in a way independent from the virtual address (195) itself. Thus, the values of the fields are not hard coded within the virtual address (195).

For example, a status field (251) can have a value indicating whether the object represented by the object ID (199) is currently in a scrambled form outside of the unscramble zone (163), such as being scrambled in the storage device (104), in the main memory (105), in the external cache (103), and/or in the scrambled zone (161) of the processor (101).

For example, a type field (253) can have a value indicating a type of scrambling applied to the object represented by the object ID (199). For example, the scrambling can be in the form of redistribution/relocating data content in different data fields (e.g., bits, bytes, words) in a data item of a predetermined width (e.g., as measured via a count of bits), as illustrated in FIGS. 2 and 3. In other instances, scrambling or encrypting can be performed using other cryptographic algorithms which can involve symmetric-key cryptography and/or public-key cryptography.

For example, a key field (255) can store a value representing a key used to secure the object represented by the object ID (199) according to the type (253).

For example, an optional address field (257) can provide the address (257) from which attributes or properties of the object represented by the object ID (199) can be retrieved. For example, the address (257) can be used to retrieve parameters related to the implementation of the type (253) of data protection, such as data field size, scrambled data fields. For example, the address (257) can be used to retrieve from the memory (105) a set of attributes and/or access control parameters of the object represented by the object ID (199). For example, the address (257) can be used to query an object name server for attributes and/or access control parameters of the object represented by the object ID (199). For example, the address (257) can be used to load a page table/page directory for the translation of the virtual addresses (e.g., 195) of the object represented by the object ID (199).

In some instances, an address translation table separate from the key store (167) is used to provide an entry specifying the physical address of a page table/page directory that is used to translate the virtual address (195) to a physical address. At least a portion of the virtual address (195) can be hashed to index into the address translation table in a way similar to the identification of a key entry (250).

In general, the hashing (181) and indexing (185) into the key store (167) for retrieving a key (250) can be different from the hashing and indexing into the address translation table for loading a page table/page directory to convert the virtual address (195) into a physical address. For example, the object ID (199) can be combined a virtual machine identifier and a user identifier for hashing into an index for an address translation table; and the object ID (199), the virtual machine identifier and the user identifier can be used to retrieve separate keys for the object, for the virtual machine, and for the user, where the separate keys are combined via a computation (e.g., key scrambling) to generate the key for the combination of the object being used in the virtual machine by the user.

Figure 7:
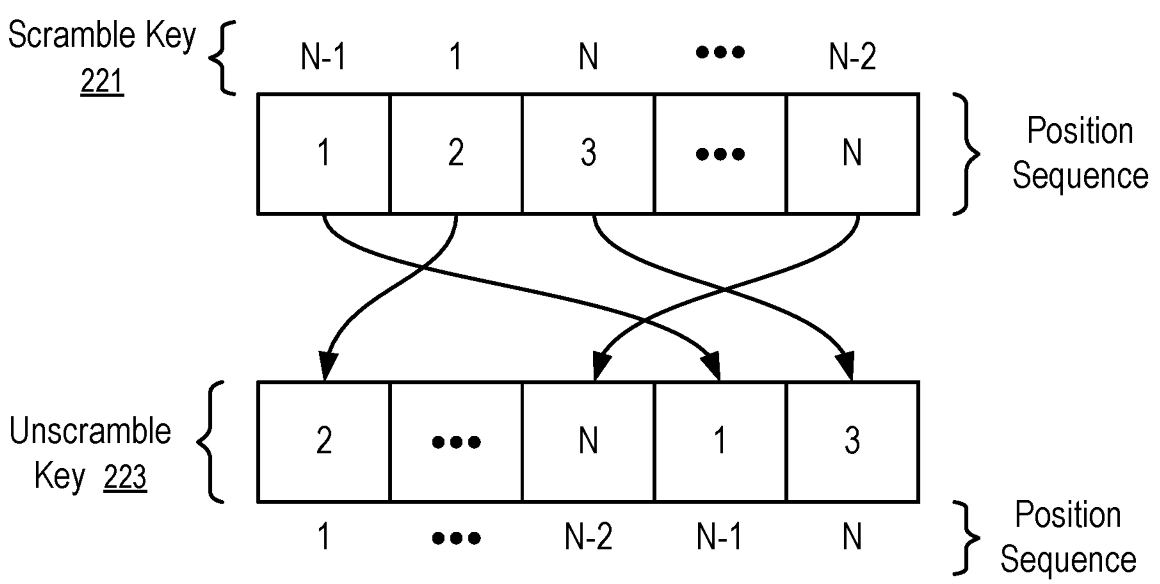
FIG. 7 illustrates the relations between a scramble key and a corresponding unscramble key.

FIG. 7 illustrates the relations between a scramble key (221) and a corresponding unscramble key (223).

In FIG. 7, a data item is divided into N fields (1, 2, . . . , N). The scramble key (221) has corresponding N fields identifying the destination fields for redistributing the content of the N source fields.

For example, FIG. 7 illustrates a scramble key (221) that specifies N−1 as the destination field for the content in the source field 1. Thus, the content in source field 1 is shuffled into the destination field N−1 during the scrambling operation. Similarly, the scramble key (221) illustrated in FIG. 7 specifies 1 as the destination field for the content in the source field 2, N as the destination field for the content in the source field 3; . . . , and N−2 as the destination field for the content in the source field N.

Thus, when the source fields 1, 2, 3, . . . , N contain the identifiers of the respective fields and the scramble key (221) is applied to scramble the data item having the position sequence of the fields, the scrambled data item contains the identifiers of the source fields 2, . . . , N, 1, 3. Thus, this particular scrambled data, generated by applying the scramble key (221) on the position sequence 1, 2, 3, . . . , N, provides the unscramble key (223).

Similarly, when scrambling is performed according to the unscramble key (223) to scramble the position sequence 1, 2, 3, . . . , N, the scrambling result provides the scramble key (221).

Thus, the scramble key (221) can be computed from the unscramble key (223); and the unscramble key (223) can be computed from the scramble key (221).

The scramble key (e.g., 221) can be generated using a random number generator. For example, a random number generator can be configured to generate numbers randomly between 1 and N. The random number generator can be used to generate a first random number as the destination field identifier (e.g., N−1) for the source field 1. Subsequently, the random number generator can be used to generate a second random number as a candidate for the destination field identifier for the source field 2. If the candidate is the same as any of the destination field identifier(s) already selected for the scramble key (e.g., 221), the candidate is discarded and another random candidate is generated by the random number generator; otherwise, the candidate can be used as the destination field identifier (e.g., 1) for the source field 2. The destination field identifiers for the subsequent fields (e.g., 3, . . . , N) can be selected in a similar way such that the sequence (e.g., N−1, 1, N, . . . , N2) in the scramble key (221) is random but contains not duplicated identifiers.

In some instances, the scramble key (221) and the data item containing the fields (1, 2, 3, . . . , N) to be scrambled have the same size. For example, to scramble a 64-bit data item where each field has 4 bits and there are 16 4-bit fields (e.g., N=16), the scramble key (221) can also be stored as also a 64-bit data item. In such a situation, the scramble key (221) can be scrambled using the same scrambler (112) for scrambling the data item.

Alternatively, the scramble key (221) can have a size different from the data item that is scrambled using the scramble key (221). For example, a data item can have 64 1-bit fields; the scramble key (221) has 64 6-bit destination field identifiers; and thus, the scramble key (221) is 6 times the size of the 64-bit data item.

In some embodiments, a scramble key (e.g., 221) is generated by rearranging the sequences of destination field identifiers according to a sequence of outputs from a random number generator. For example, the position sequence of 1, 2, 3, . . . , N can be used as an initial candidate of the scramble key. In response to the random number generator provides a random number i between 1 and N, the key generator extracts the ith destination field identifier from the sequence and insert it into a predetermined location (e.g., at the beginning of the sequence, at the end of the sequence, at another predetermined position, or at a position identified by the next random number generated by the random number generator). After shuffling a number of times the sequence of destination field identifiers, the resulting randomized sequence of the destination field identifiers can be used as a scramble key (e.g., 221), or as the unscramble key (e.g., 223).

Figure 8:
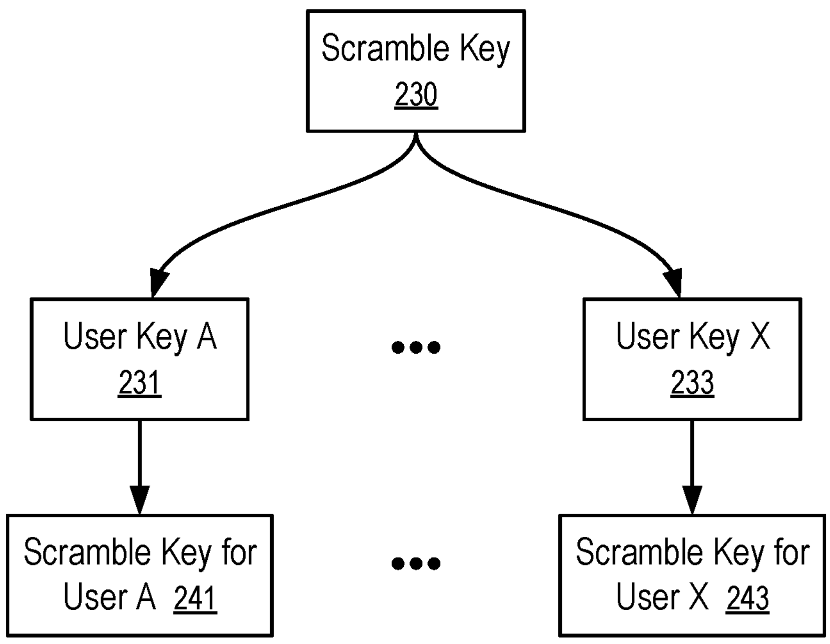
FIG. 8 illustrates a technique to add user specific data protections.

FIG. 8 illustrates a technique to add user specific data protections.

For example, an object can be scrambled using a scramble key (230). When instances of the object are used by different users, the user-specific instances can be further scrambled based on user keys (231, . . . , 233).

Multiple layers of scrambling made using multiple keys can be performed and/or unscrambled using a composite key. For example, the scramble key (230) can be combined with the user key A (231) to generate a scramble key (241) for the user A; and the scramble key (230) can be combined with the user key X (233) to generate a scramble key (243) for the user X. The user X cannot derive the scramble key (241) for user A from the scramble key (230) and the user key X (233); and the user X cannot unscramble the object instance scrambled using the scramble key (241) for user A without the user key A (231).

For example, each user key (e.g., 231 or 233) can be a random number specific for the respective user. The random number can be added to each of the N destination field identifiers in the scramble key (231), modulo N, to obtain a user specific scramble key (e.g., 241 or 243).

For example, each user key (e.g., 231 or 233) can be a separate scramble key that is used to scramble the common scramble key (230) to generate the user specific scramble keys (e.g., 241, or 243).

For example, FIG. 7 illustrates the scrambling of the position sequence 1, 2, 3, . . . , N using the scramble key (221) to generate the unscramble key (223). The unscramble key (223) can be further scrambled using a user key (e.g., 241, or 243) to generate the user specific unscramble key for unscrambling the result generated from scrambling initially using the scramble key (221) and then using the user key (e.g., 241, or 243). The user specific scramble key can be computed by scrambling the position sequence 1, . . . , N−2, N−1, N according to the user specific unscramble key. Scrambling using the user specific scramble key generates the same result as initially scrambling using the scramble key (221) and then further scrambling its result using the user key (e.g., 241, or 243).

In general, multiple layers of scrambling operations using multiple keys can be reduced to the scrambling using a single composite key; and the single composite key can be calculated from the multiple keys.

For example, an object can be protected via scrambling using an object key assigned to the object. A virtual machine can be protected via scrambling using a virtual machine key assigned to the virtual machine. A user or user account can be protected via scrambling using a user key assigned to the user or user account. A running process can be protected via scrambling using a process key assigned to the running process. Instead of separately using the object key, the virtual machine key, the user key, and the process key for unscrambling a data item of the object used in the process running in the virtual machine for the user or user account, a single combined unscramble key can be generated from the object key, the virtual machine key, the user key, and the process key; and the combined unscramble key can be used for the unscrambling of the scrambled data item protected via the object key, the virtual machine key, the user key, and the process key. The combined unscramble key can be derived from a subset of the object key, the virtual machine key, the user key, and the process key. Similarly, the single combined scramble key can be calculated from the object key, the virtual machine key, the user key, and the process key for scrambling clear data into a scrambled form protected via the object key, the virtual machine key, the user key, and the process key such that a malicious program in possession of some of the keys but not all of the keys cannot unscramble the data.

The processor (101) can be configured to dynamically calculate the combined keys from multiple layers of keys (e.g., keys for protections of objects, virtual machines, users/user accounts, and running processes). Thus, the size of the key store (167) can be reduced for different combinations of objects, virtual machines, users/user accounts, and/or running processes.

Figure 9:
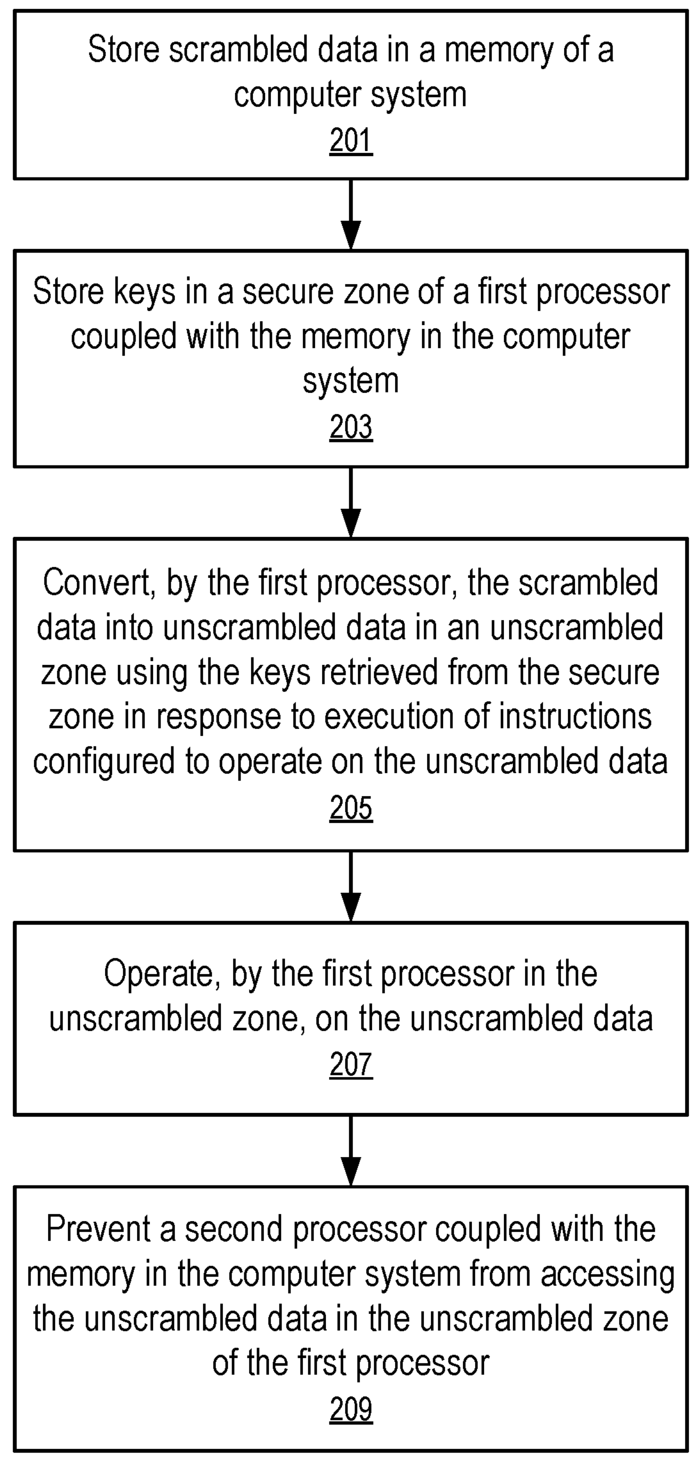
FIG. 9 shows a method of key management for data protection in a computer processor.

FIG. 9 shows a method of key management for data protection in a computer processor. For example, the method of FIG. 9 can be implemented in the computer system of FIG. 1, 4, or 5 with an unscrambler (113) of FIG. 3.

At block 201, a computer system stores scrambled data (109) in a memory (105).

For example, the computer system can have multiple processors (e.g., 101 and 102) that share the same memory (105). It can be desirable to prevent a malicious program running in one processor (e.g., 102) to access the content of another processor (e.g., 101) via exploiting certain security vulnerabilities.

At block 203, a first processor (101) of the computer system stores keys (e.g., 255) in a secure zone (165) of the first processor (101) that is coupled with the memory in the computer system.

At block 205, the first processor (101) converts the scrambled data (109) into unscrambled data (117) in an unscrambled zone (163) of the first processor (101) using the keys retrieved from the secure zone (165), in response to execution of instructions configured to operate on the unscrambled data (117).

At block 207, the first processor (101) operates, in the unscrambled zone, on the unscrambled data (117).

At block 209, the first processor (101) prevents a second processor (102) coupled with the memory (105) in the computer system from accessing the unscrambled data (117) in the unscrambled zone (163) of the first processor (101).

The first processor (101) and the second processor (102) can further share a storage device (104) that stores the scrambled data (109), and/or an external cache (103) that stores the scrambled data. The second processor (102) may even have access to data in a scrambled zone (161) inside the first processor (101), such as accessing the internal cache (107) of the processor (101) via a cache coherence protocol. In some instances, the first processor (101) and the second processor (102) can be processing cores packaged in a same integrated circuit chip.

For example, the unscrambled zone (163) can include a memory address register (169) configured to store a virtual memory address (169) used to identify the location of the scrambled data (109) for loading into the unscrambled zone (163). The first processor (101) is configured to unscramble the scrambled data (109) in response to an instruction using the virtual memory address (195) to load the scrambled data (109) for operations within the unscrambled zone (163).

For example, the unscrambled zone can include an execution unit (115) that is configured to perform the operations on a data item located at the virtual memory address (195) during the execution of an instruction.

The virtual memory address (195) can include a field containing an object identifier (199); and the first processor (101) is configured to retrieve, generate, and/or obtain an unscramble key (223) based on the object identifier (199).

For example, the technique of FIG. 6 to retrieve a key (255) from a key store (167) illustrated in FIG. 5 can be used.

For example, the secure zone (165) has a key store (167). The first processor (101) is configured to hash (181) at least the object identifier (199) into an index (185) and use the index (185) to retrieve an entry (250) from the key store (167).

For example, the entry (250) can include at least one of a status indication (251) of whether an object represented by the object identifier is scrambled, a type (253) of scrambling of the object, or a key (255), or any combination thereof.

For example, the key store (167) in the secure zone (165) can further include a collision chain (260) configured to identify different entries (e.g., 262 and 264) for different object identifiers (e.g., 261 and 263) that are hashed into a same index (e.g., 185). The first processor (101) can identify the entry (250) using the collision chain (260) if there is a hash collision for the index (185).

For example, the first processor (101) can further store at least one of a key for a virtual machine hosted in the computer system, a key for a user account, or a key for a running process, or any combination thereof. The scrambled data can be protected via multiple layers of scrambling corresponding to multiple keys, such as the key for the object, the key for the virtual machine, the key for the user account, and/or the key for the running process for which the first processor (101) is currently executing instructions. The first processor (101) can compute a combined key from the multiple keys to implement the scrambling or unscrambling corresponding to the multiple keys. The combined key can be computed from scrambling one key using another key. The combined key can be specific to an object, a user using the object, a process running a program for the user, and/or a virtual machine in which the program is being executed using the first processor (101).

In general, the unscrambled data (117) can be an instruction, an address, or an operand of an instruction. The scrambled data (109) and the unscrambled data (117) can have a same set of bits having different orders from one another.

The techniques disclosed herein can be implemented in a computer system (e.g., illustrated in FIGS. 1 and 3) that has at least one processor (e.g., 101) coupled to a memory system (e.g., 104, 105 and/or 103) via one or more buses. The memory system can have multiple memory components.

For example, the buses can include a memory bus connecting to one or more memory modules and/or include a peripheral internet connecting to one or more storage devices. Some of the memory components (e.g., 103 and/or 105) can provide random access; and the some of the memory components (e.g., 104) can provide persistent storage capability. Some of the memory components (e.g., 103 and/or 105) can be volatile in that when the power supply to the memory component is disconnected temporarily, the data stored in the memory component will be corrupted and/or erased. Some of the memory components (e.g., 104) can be non-volatile in that the memory component is capable of retaining content stored therein for an extended period of time without power.

In general, a memory system can also be referred to as a memory device. An example of a memory device is a memory module (e.g., 105) that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device (104) that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the processor (e.g., 101 or 102). Alternatively, or in combination, a memory component can include a type of volatile memory. In some instances, a memory component can include, but is not limited to, random access memory (RAM), read-only memory (ROM), dynamic random access memory (DRAM), synchronous dynamic random access memory (SDRAM), phase change memory (PCM), magneto random access memory (MRAM), spin transfer torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a processor (e.g., 101 or 102) can utilize a memory system (e.g., 103, 104, and/or 105) as physical memory that includes one or more memory components. The processor (e.g., 101 or 102) can load instructions from the memory system (e.g., 103, 104, and/or 105) for execution, provide data to be stored at the memory system (e.g., 103, 104, and/or 105), and request data to be retrieved from the memory system (e.g., 103, 104, and/or 105).

The processor (e.g., 101 or 102) can include a memory management unit (MMU), execution units (e.g., 115), such as an arithmetic-logic unit, and/or registers (e.g., 133) to hold instructions for execution, data as operands of instructions, results of instruction executions, and/or addressed (e.g., 195) for loading instructions from the memory system (e.g., 103, 104, and/or 105), retrieving data from the memory system (e.g., 103, 104, and/or 105), and/or storing results into the memory system (e.g., 103, 104, and/or 105). The processor (e.g., 101) can have an internal cache (107) and/or an external cache (103) as a proxy of a portion of a memory module (e.g., 105) and/or a storage device (e.g., 104).

Scrambled data (109) for processing and/or executing in the processor (101) can be initially stored in a storage device (e.g., 104) or a memory module (e.g., 105). The scrambled data (109) can include instructions for executing in the execution units (e.g., 115) of the processor (101) and/or operands for processing during execution of the instructions. The scrambled data (109) can include results generated by the execution units (e.g., 115) processing the operands during the execution of the instructions. The scrambled data (109) routines stored initially in the memory (105) or the storage device (104) can be loaded to the external cache (103) and/or the internal cache (107) in a scrambled form, before being unscrambled as the unscrambled data (117) for processing in the execution units (e.g., 115) in an unscrambled form.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computing system, comprising:

an unscrambled zone, of a processor, having circuits configured to perform operations on unscrambled data;

a cache, of the processor, configured as a gateway to the unscrambled zone from outside of the processor and configured to store scrambled data;

a logic circuit, of the processor, coupled with the cache and with the circuits of the unscrambled zone and configured to unscramble scrambled data from the cache for transfer to the circuits of the unscrambled zone, and configured to scramble unscrambled data from the unscrambled zone for transfer to the cache; and a secure zone, of the processor, coupled with the logic circuit and configured to communicate, to the logic circuit, keys for scrambling data and unscrambling data.

2. The computing system of claim 1, wherein the unscrambled zone includes at least one execution unit and at least one register.

3. The computing system of claim 1, wherein the processor further includes the secure zone having a key store.

4. A method, comprising:

communicating, by a secure zone of a processor of a computing system, keys used in scrambling and unscrambling operations to a logic circuit of the processor;

storing, in a cache of the computing system, data in a scrambled form;

converting, by the logic circuit of the processor using the keys from the secure zone, the data from the scrambled form to an unscrambled form for transfer of the data to an unscrambled zone of the processor;

performing, in the unscrambled zone of the processor, computation operations on the data from the logic circuit in the unscrambled form; and converting, by the logic circuit of the processor using the keys from the secure zone, results of the computation operations from the unscrambled form to the scrambled form for transfer of the results to the cache of the processor.

5. The method of claim 4, wherein the cache is configured as a gateway for data to enter the unscrambled zone for processing and for results of the processing to leave the unscrambled zone.

6. The method of claim 4, wherein the unscrambled zone includes at least one execution unit and at least one register.

7. The method of claim 4, wherein the processor further includes the secure zone having a key store.

8. A device, comprising:

a processor having:

a cache configured to store scrambled data;

an unscrambled zone having circuits configured to perform operations on unscrambled data;

a secure zone configured to manage keys used in scrambling data for transfer to the cache and unscrambling data for transfer to the unscrambled zone; and a logic circuit coupled with the secure zone, the unscrambled zone, the cache, the logic circuit configured to receive keys from the secure zone, use the keys to scramble unscrambled data from the unscrambled zone for transfer to the cache, and use the keys to unscramble data from the cache for transfer to the unscrambled zone.

9. The device of claim 8, wherein the cache is configured as a gateway to the unscrambled zone from outside of the processor.

10. The device of claim 8, wherein the unscrambled data is an instruction, an address, or an operand of an instruction.

* * * * *